United States Patent [19]

Jones

[11] 4,184,618

[45] Jan. 22, 1980

[54] ARTICLE CARRYING ATTACHMENT FOR WALKERS

[76] Inventor: Marjorie F. Jones, Box 519, Casa Grande, Ariz. 85222

[21] Appl. No.: 800,636

[22] Filed: May 26, 1977

[51] Int. Cl.$^2$ .............................................. B60R 11/00

[52] U.S. Cl. ............................ 224/42.46 R; 211/116; 297/5

[58] Field of Search ................. 224/42.46 R, 42.45 R, 224/42.43, 42.41, 29 R, 30 A, 30 R, 32 R, 36 R, 35, 39 R, 41; 280/33.99 A, DIG. 4; 211/113, 116, 86; 297/5, 6, DIG. 4; 248/360

[56] References Cited

U.S. PATENT DOCUMENTS

| | | | |
|---|---|---|---|
| 2,544,220 | 3/1951 | Concklin | 280/DIG. 4 |
| 2,558,372 | 6/1951 | Nidermayer | 224/42.43 UX |
| 2,633,278 | 3/1953 | Muniz | 280/33.99 A |
| 2,735,597 | 2/1956 | Treleven | 224/29 R |
| 2,763,413 | 9/1956 | Felton | 280/33.99 A |
| 2,835,425 | 5/1958 | Shultz | 224/42.46 R |
| 2,982,982 | 5/1961 | Swift | 248/226 E X |
| 3,921,870 | 11/1975 | Camp | 224/42.43 X |

*Primary Examiner*—Jerold M. Forsberg
*Attorney, Agent, or Firm*—Gregory J. Nelson

[57] ABSTRACT

A caddy for attaching to a walker having a compartment sub-divided to accommodate various items and suspended from two or more hangers or hooks, securable to a walker frame member.

5 Claims, 10 Drawing Figures

ARTICLE CARRYING ATTACHMENT FOR WALKERS

The present invention relates to an article carrying device or caddy and more particularly relates to an article carrying device or caddy adapted for attachment to mobile walkers used by individuals when they need assistance or additional support when walking.

Support devices which are mobile and used as walking aids are generally referred to as "walkers". These devices generally consist of a three-sided frame formed of a front and side portions which are open at the rear to allow the user to occupy the space defined by the frame and support himself or herself at the sides of the frame by handle grip bars. These walkers are widely used by individuals who are recuperating from operations or have suffered physical injury or disability and need additional support or assistance to move about safely. Devices of this type offer more stability than conventional crutches.

While these walker devices offer assistance or support to individuals, it is difficult for the individuals to transport various articles or items about when using the walker. The movement of the walker necessarily involves the use of both hands so that the individual is not able to carry anything when manipulating the walker. The user must, while standing, move the walker forward and then, with the walker stationary, step forward in the walker while holding the hand grip. Thus, it is difficult, if not impossible, for the user to carry an item such as a book or a snack from one room to the other while using a walker. This creates a considerable inconvenience to the user.

A few attempts have been made to provide an attachment for walkers for containing articles which an individual needs to keep at hand. For example, the patent to Mendenhall, U.S. Pat. No. 2,430,235 shows a walking aid having a tray at the front of the frame for supporting or carrying articles. The tray is permanently affixed to the walker and protrudes from the front. The tray of the Mendenhall patent, while representing an advanced state of the art, has significant disadvantages. The Mendenhall device cannot be detached from the walker if the user does not wish or require the caddy tray attachment. Further, the Mendenhall device is a simple tray which does not provide for convenient containment of many of the personal articles required by the user. Since the Mendenhall device cannot be detached, and because it protrudes from the front of the walker, the overall width of the walker is significantly increased making storage of the walker more difficult.

Briefly, the present device provides a novel and convenient receptacle or caddy which detachably is secured to conventional walkers of various designs. The caddy or receptacle of the present invention includes a box-like compartment which is supported on two or more hangers having hook ends which are adapted to engage a frame member of the walker and support the receptacle in place. The caddy or receptacle may be divided into several sub-compartments for containing various items. The receptacle may also define one or more wells to receive a drinking glass or cup and secure a glass or cup in position to prevent spillage. A pouch may also be associated with the receptacle having an appropriate closure. The hanger may be laterally adjsutable on the receptacle and may also be pivotable both in a horizontal and a vertical axis for convenience of attachment to walkers of various conventional designs.

The above and other objects and advantages of the present invention will be more fully appreciated from the following specification, claims and drawings in which:

Figure 1:
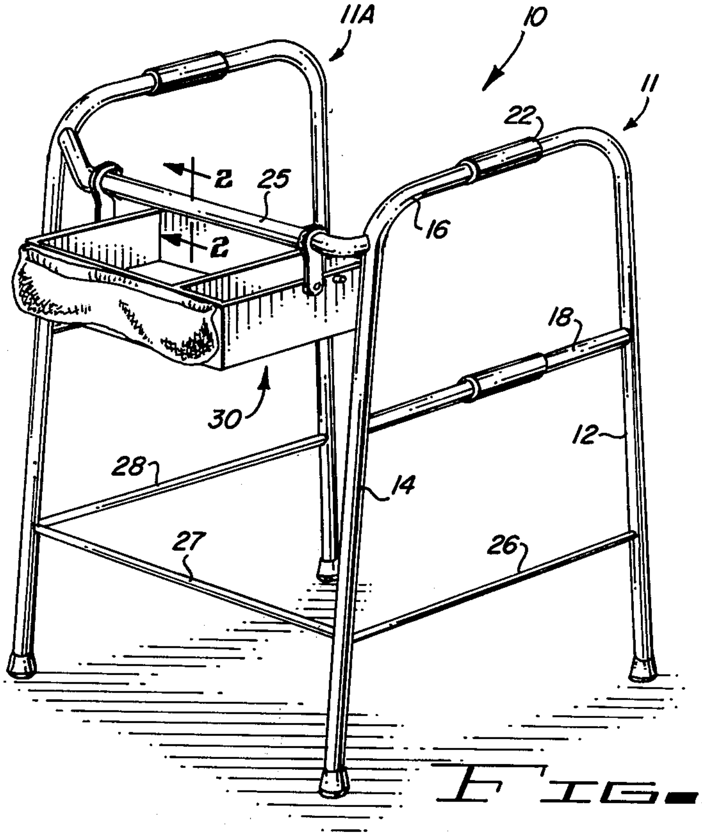
FIG. 1 is a perspective view of a patient walker showing caddy of the present invention in place.

Turning now to the drawings, FIG. 1 illustrates a conventional walker generally designated by the numeral 10. The walker consists essentially of a three-sided frame having one side 11 formed by generally vertical legs 12 and 14 connected across their top ends by horizintal frame member 16. A horizontal brace 18 extends between legs 12 and 14 and opposite side 20 is similarly formed. Each of the sides is provided with a hand grop 22 to permit the individual using the frame to grasp the walker. Opposite side 11A is similarly constructed. A generally horizontal frame member 25 extends across the front of the walker near the top of the side members between sides 11 and 11A. Additional braces 26, 27 and 28 provide additional rigidity to the structure. This construction for a walker is more or less conventional and is set forth only to aid in understanding of the present invention. It will be appreciated, the user while holding to and being supported by the stationary walker, moves forward. Then, the user must stand still, lift the walker and move it forward, when employing this device.

A preferred embodiment of the caddy or receptacle 30 of the present invention is illustrated in FIGS. 1-4 and 10. In FIG. 1 the caddy 30 is shown attached or suspended or supported on horizontal frame member 25. The caddy 30 includes a box-like structure having a bottom 32, opposite sides 34 and 36, front wall 38 and rear wall 40. The caddy has an open top. One or more components 42 and 44 may be provided within the receptacle 30 by appropriate partition wall 46. A series of annular ridges 48 are provided in bottom surface 32 which serve to retain objects placed in the receptacle, particularly a plate or saucer. The ridges 48 prevent the saucer or similar object from sliding as the walker is moved. Similarly, bottom wall 32 defines a well 49. Well 49 is generally circular but may be provided with an adjacent projection 50 so that the well can accommodate either drinking glasses or cups. The projection 50 will receive the handle portion of a conventional coffee cup. A soft, flexible pouch 52 is secured to the front wall 40 of the receptacle. The pouch may be provided with elastic closure 53 to retain articles within the pouch.

The caddy of the present invention may be fabricated from any suitable material, preferably a durable lightweight material such as a molded polyethelene, vinyl or similar plastic.

Figure 2:
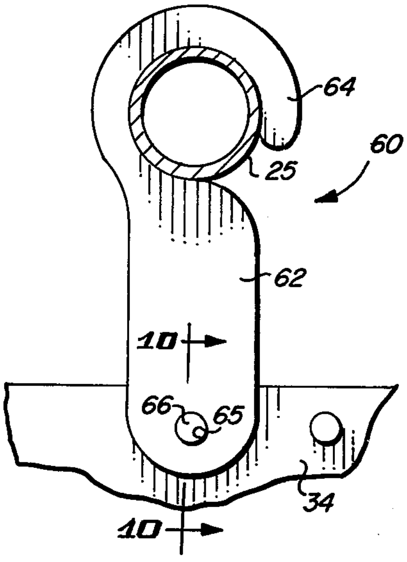
FIG. 2 is a sectional view taken along line 2—2 of FIG. 1 and illustrates the hanger support.
Figure 3:
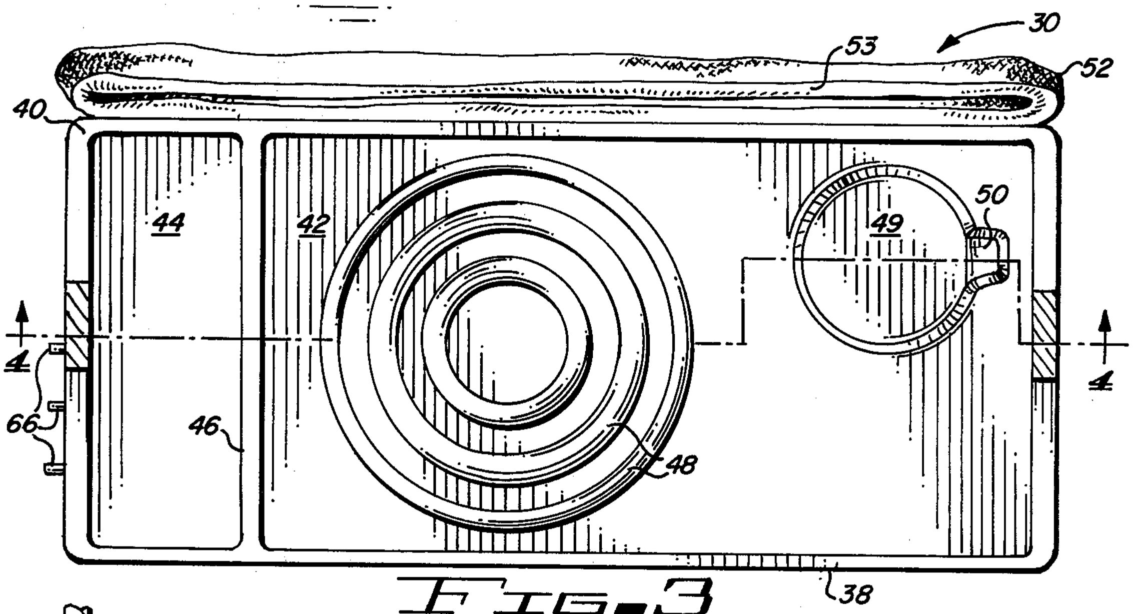
FIG. 3 is a plan view of the caddy of the present invention.
Figure 4:
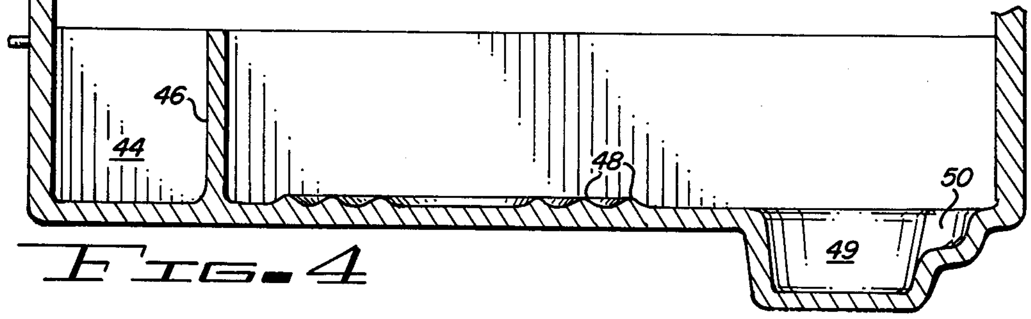
FIG. 4 is a sectional view taken along line 4—4 of FIG. 3.
Figure 10:
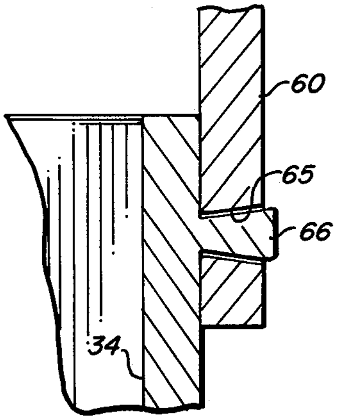
FIG. 10 is a sectional view taken along lines 10—10 of FIG. 2.

The receptacle 30 is supported on a pair of hangers 60 disposed at the opposite side of walls 34 and 36 of the device. Each of the hangers has a shaft or arm 62 terminating at a hook end 64. The hook end 64 is flexible so that the hook may be opened to be placed about a frame member 25 as best seen in FIG. 2. The lower end of arm 62 is provided with a bore 64. A series of spaced-apart designed projections or pins 66 are located on sides 34 and 36 of the receptacle. The projections or pins 66 are preferrably slightly outwardly diverging as best seen in FIG. 10. This permits the hangers 60 to be engaged over the projections 66 at bores 65. Thus, the hangers 60 are pivotally secured to the receptacle 30 and may be transversely adjusted along the sides 34 and 36 from the position shown in FIG. 1, to a position with the rear wall 38 in generally the same plane as the front legs of the walker. This allows the receptacle to be used with walkers of various designs. For example, some walkers are provided with additional bracing members extending between legs 14 and horizontal bar 25 which would not allow the receptacle to be suspended in the center position as shown in FIG. 1. In this case, the hangers would simply be engaged in the rearward projection 66, and rear wall 38 would rest against the bracing members, extending between the legs 14 and cross frame member 25. It will be obvious that in some cases, the hangers can be integrally formed as a part of the sidewalls 32 and 34.

Figure 5:
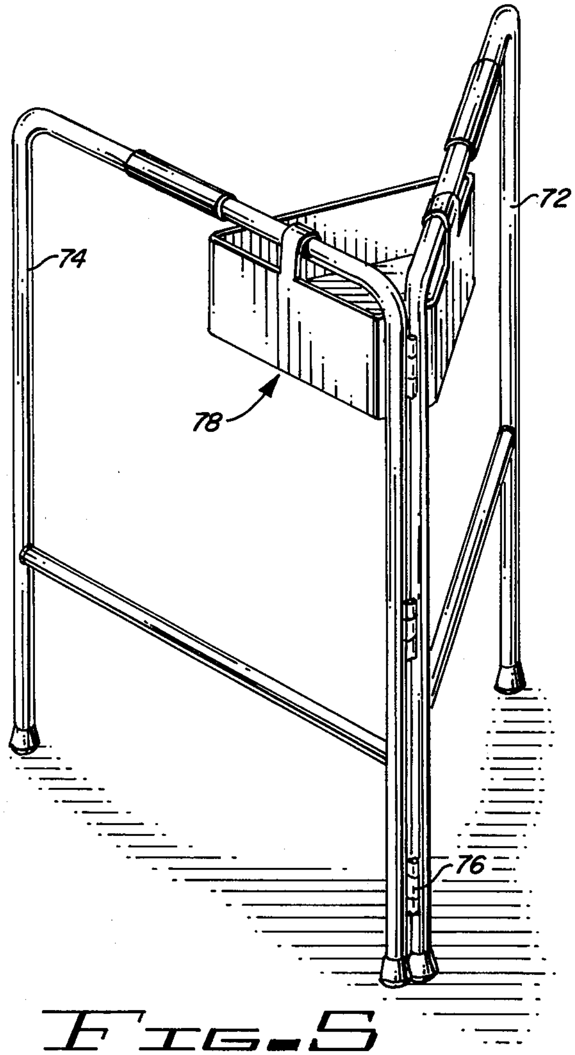
FIG. 5 is a perspective view illustrating another conventional form of walker known as the collapsible walker and illustrating another by the present invention attached to the walker.
Figure 6:
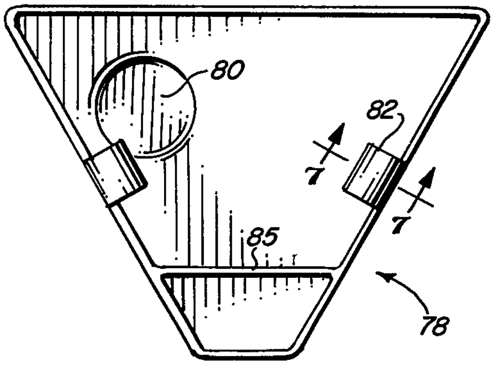
FIG. 6 is a plan view of the caddy shown in FIG. 5.
Figure 7:
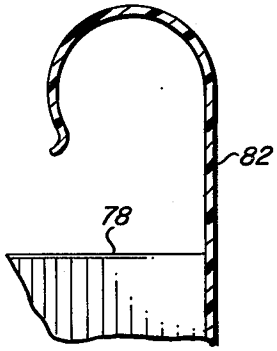
FIG. 7 is a sectional view taken along line 7—7 of FIG. 6.

FIG. 5 shows another form of walker designated by the numeral 70 which is of the folding type. Walker 70 has two opposite sides 72 and 74 which are hingedly affixed at 76. The configuration of walker 70 in an unfolded position is generally triangular. Accordingly, receptacle 78 shown in FIGS. 5 and 6 has a generally triangular configuration. Again, receptacle 78 is provided with sidewalls 79 which form a box-like structure. A well 80 is provided for seat of a glass or drinking cup. Interior pattern wall 85 subdivides the interior of the receptacle 78 into opposite compartments. Hangers 85 are shown as being permanently affixed to the widewalls 79 of the receptacle and again provided with an upper hook-like member 84. The hanger is best seen in FIG. 7 and hook 84 is adapted and engaged over the upper horizontal frame members of said 72 and 74 of the walker. The hook 84 may be bendable to the desired position by the inclusion of a suitable metal or wire core.

Figure 8:
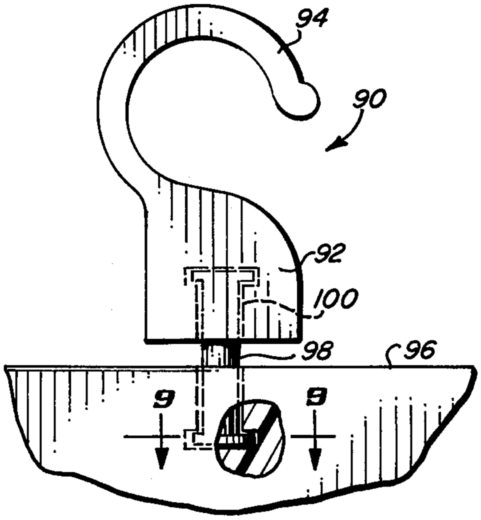
FIG. 8 is a detail view illustrating another form of hanger which may be used with the caddy of the present invention.
Figure 9:
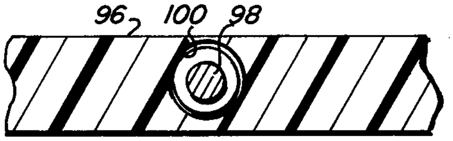
FIG. 9 is a sectional view taken along line 10—10 of FIG. 8.

FIG. 8 shows another form of the hanger which is generally designated by the numeral 90. The hanger 90 includes an arm member 92 and an upper hook member 94. The wall 96 of the receptacle and the body or arm 92 of the hanger both define a generally "T" shaped apeture which receives pivot pin 98 having enlarged annular end sections 100. It will be appreciated, that by this construction, hanger 94 can be vertically rotated about pin 98 to any desired position to permit the receptacle to be secured to walkers of various construction.

Thus, it will be seen that the present invention provides a novel and convenient aid for the individual using a walker. The device permits the user to carry various personal articles such as snacks, books, pencils, newspapers, magazines and the like from place to place easily and with facility. The device is adapted to be compatible with a wide range of walker designs presently manufactured. The device can be removed when not required or if the walker is to be stored. Removal also allows the caddy to be cleaned.

From the foregoing, construction and operation of the device will be readily understood. Various modifications and changes will occur to those skilled in the art and to the extent such modifications and changes do not depart from the spirot and scope of the appended claims, they are intended to be encompassed therein.

I claim:

1. A caddy for a mobil walker of the type having a frame including at least one generally horizontal frame member supported on one or more generally vertical depending legs, said caddy comprising:
   (a) a generally rigid receptacle having a bottom and upstanding sidewalls, and front and rear walls, said bottom defining a first generally circular recess having a diameter adapted to support and retain a plate, said bottom further defining a second generally circular depression being of a size and dimension to receive a drinking utensil; and
   (b) attachment means at each of said sidewalls for securing said receptacle to said horizontal frame member, said attachment means each having a hook defining an opening securable about said horizontal frame member, said attachment means including an arm, each arm having an aperture therein, and
   (c) said opposite sidewalls each being provided with a plurality of spaced-apart projection means selectively engageable with said apertures in said attachment means whereby said attachment means can be detachably secured at a plurality of transverse locations at said sidewalls to retain said caddy in a stable, generally horizontal position so the attachment means can be adjusted to accomodate various loads and walker geometry.

2. A caddy for a mobil walker of the type having a frame including at least one generally horizontal frame member supported on one or more generally vertical depending legs, said caddy comprising:
   (a) a generally rigid receptacle having a bottom and upstanding sidewalls, and front and rear walls, said bottom defining a first generally circular recess having a diameter adapted to support and retain a plate, said bottom further defining a second generally circular depression being of a size and dimension to receive a drinking utensil; and
   (b) attachment means at each of said sidewalls for securing said receptacle to said horizontal frame member, said attachment means including a hook portion adapted to engage said horizontal frame member to retain said caddy in a stable, generally horizontal position, each of said hangers including arm means defining a generally T-shaped recess therein, said opposite sidewalls each defining a generally T-shaped opening therein; and
   (c) pin means having an an annular projection adjacent each end cooperatively fitting into the said T-shaped openings in said attachment means and said sidewalls whereby said attachment means may be pivoted about a vertical axis to accomodate various loads and walker geometry.

3. The caddy of claim 1 or 2 wherein said first depression includes at least one annular rib member for retaining said plate thereon.

4. The caddy of claim 1 or 2 wherein said second depression includes means adapted to receive and retain the handle of a drinking cup placed in said depression.

5. The caddy of claim 1 or 2 wherein said receptacle is divided into at least two compartments by a partition extending between opposite walls.

* * * * *